June 19, 1951  G. H. RUSSELL ET AL  2,557,893
SEAL BEAM HEADLIGHT ADJUSTER
Filed Oct. 18, 1948  2 Sheets-Sheet 1
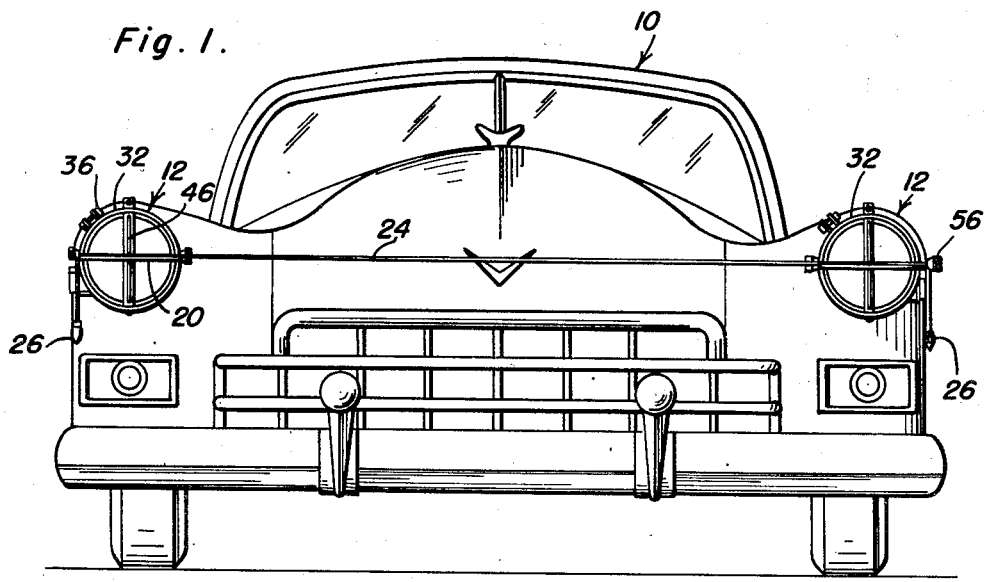
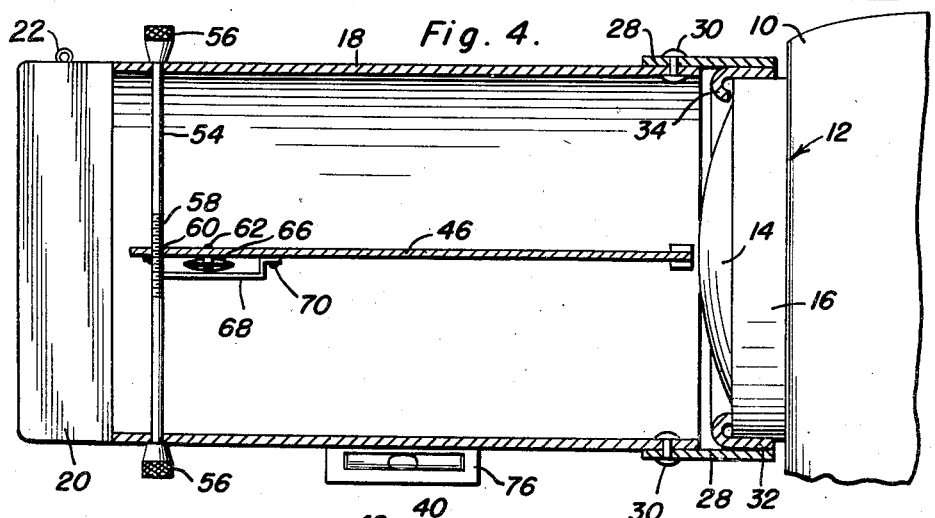
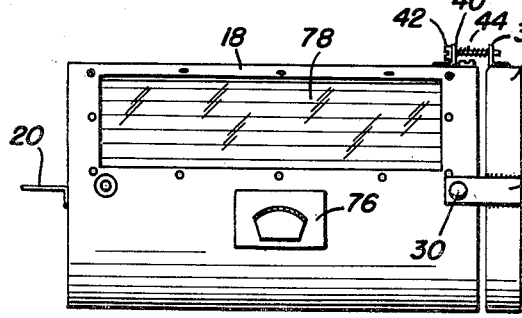
George H. Russell
Fount L. Rice
INVENTORS
BY June 19, 1951  G. H. RUSSELL ET AL  2,557,893
SEAL BEAM HEADLIGHT ADJUSTER
Filed Oct. 18, 1948  2 Sheets-Sheet 2
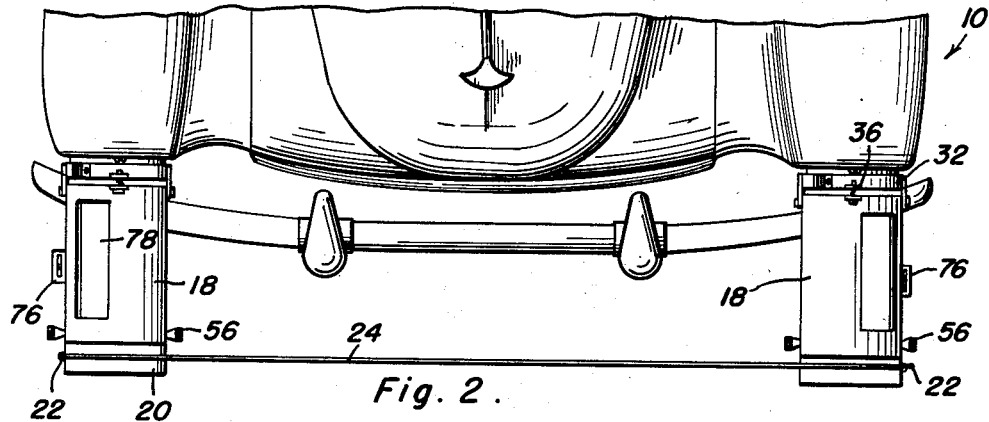
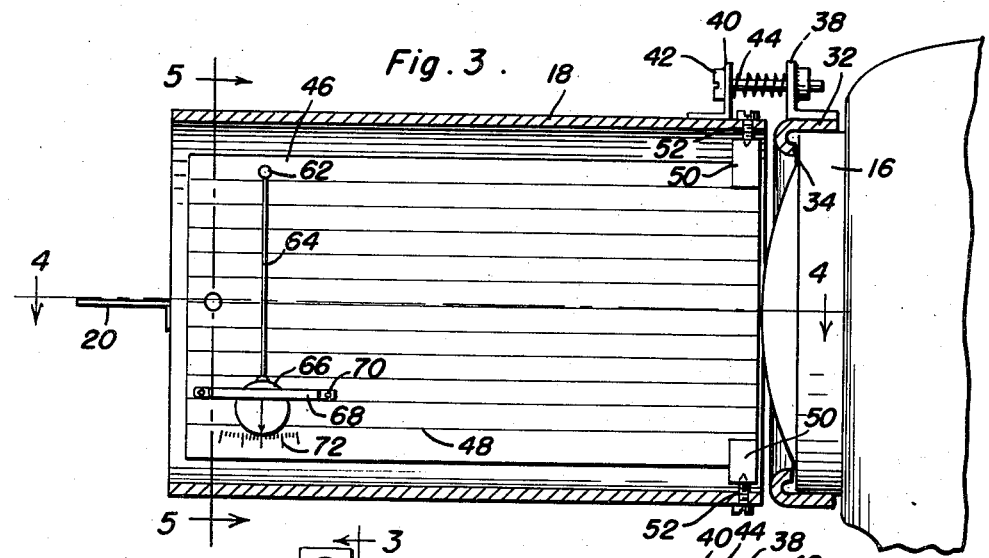
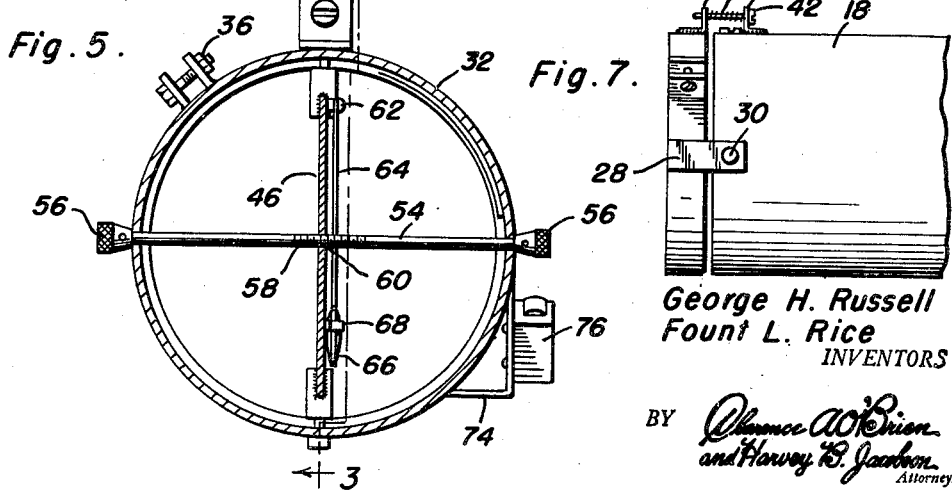
George H. Russell
Fount L. Rice
INVENTORS Patented June 19, 1951

2,557,893

UNITED STATES PATENT OFFICE 2,557,893

SEAL BEAM HEADLIGHT ADJUSTER

George H. Russell and Fount L. Rice,
Reno, Nev.

Application October 18, 1948, Serial No. 55,104

4 Claims. (Cl. 33—180)

This invention relates to a headlight adjuster for use primarily to adjust seal beam headlights horizontally, vertically, and with relationship to each other.

Yet another object of this invention is to provide a seal beam headlight adjuster which is light in weight, simple in operation, and extremely efficient since the maximum time required to adjust a set of seal beam headlights with this device is approximately fifteen minutes.

Yet another object of this invention is to provide a seal beam headlight adjuster which does not require the use of any lenses, gauges or other parts which are easily broken or bent.

A still further object of this invention is to provide a seal beam headlight adjuster requiring no light meter as is required in the conventional headlight adjuster.

Yet another object of this invention is to provide head lamp aiming and adjusting means which is readily transportable and which requires a minimum of space for its use.

These, together with various ancillary objects and features of the invention which will later become apparent as the following description proceeds, are attained by the device, a preferred embodiment of which has been illustrated by way of example only in the accompanying drawings, wherein.

Figure 1 is a front elevational view of the device in use attached to a seal beam headlight on an automobile vehicle;

Figure 2 is a top plan view of the device shown in Figure 1;

Figure 3 is a longitudinal sectional view through one of the adjuster housings;

Figure 4 is a sectional view taken substantially on the plane of section line 4—4 of Figure 3;

Figure 5 is a sectional view taken substantially on the plane of section line 5—5 of Figure 4;

Figure 6 is a side elevational view of one of the adjuster housings; and

Figure 7 is a fragmentary side elevational view of one of the adjuster housings taken on the other side of Figure 6.

Specific reference is now made to the drawings. In the several views in the accompanying drawings and in the following specification similar reference characters indicate corresponding elements throughout.

Indicated generally at 10 is an automotive vehicle which is provided with the conventional seal beam head lamps 12 having lenses 14 secured in place on the automotive vehicle by the conventional rims 16. It is to be understood that the seal beam head lamps are provided with the usual headlight adjusting screws (not shown).

The device of the instant invention consists essentially of a pair of cylindrical housings 18 which are to be attached to each of the head lamps 12 for adjustment of the latter horizontally, vertically, and with relationship to each other. Since the two housings are identical in construction and function, the description of the device of the instant invention will refer to one of these housings and operative parts, it being understood that the second housing is similar in construction and design to the one being described.

It will be seen that the cylindrical housing 18 has secured to it at its forward end a diametrically extending substantially L-shaped squaring plate 20, each of the plates being provided with an eye lug 22 for guidingly retaining on the plate 20 a plumb line 24, the free ends of the plumb line being provided with conventional plumb bobs 26. This constitutes the means for adjusting the head lamps 12 with relationship to each other, since the rotation of the head lamps by means of the conventional adjusting screws (not shown), will actuate the plumb lines 24 to lie flat upon both of the squaring plates 20 on each of the housings 18.

To the rear end of each housing 18 is secured by means of lugs 28 and bolts or screws 30 a substantially circular clamp 32 having an inwardly turned annular flange 34 for gripping the head lamp rim 16 when the clamp 32 is slipped on the seal beam headlight for use. As shown clearly in the drawings, the clamps 32 are conventional split clamps which are further provided with an adjusting screw 36 for tightening the clamps about the rims 16.

Secured to the top of the clamp 32 is a substantially L-shaped apertured lug 38, while a similar apertured lug 40 is alined with the lug 38 and secured to the upper outer face of the housing 18. Both of the apertures in the lugs 38 and 40 are, of course, internally threaded and through these apertures extends an adjusting screw 42 about which is entrained a coil spring 44 intermediate the lugs 38 and 40. Thus, by tightening or loosening the screw 42, the housing 18 may be adjusted vertically relative to the head lamps.

Positioned within the housing 18 is a longitudinally extending, substantially rectangular, grid 46 having transversely spaced longitudinally extending parallel lines 44 on both faces thereof. At the rear end of the housing 18, the grid 46 is pivoted to the housing by means of a pair of split clamps 50 having depending screws 52 extending through suitable apertures in the housing 18. Adjacent the forward end of the housing 18 is provided a diametrically extending adjusting rod 54 which extends through suitable apertures on both sides of the housing and is provided at its free ends with a pair of knurled knobs or handles 56. The rod 54 is further provided centrally with external screw threads 58. The screw threaded portion 58 of the rod 54 further extends through an internally threaded aperture 60 provided in the forward end of the grid 46. Thus, by turning the rod 54 in a given direction, the grid 46, because it is pivoted to the housing 18 at its rear end may be inclined at any desired angle.

Secured to the top edge of the grid 46 adjacent its forward end by means of a bolt or pin 62 is a pendulum 64 which is further provided at its free end with a weighted, preferably circular pointer 66. The pointer 66 swings in a vertical plane parallel to the grid and is guidingly retained adjacent the grid by means of a sleeve member 68 secured at both ends as at 70 to the grid 46. Immediately below the pointer 66, the grid 46 is graduated to produce a somewhat arcuated scale 72.

By means of a suitable bracket 74 secured to a side of the housing 18, a conventional liquid level indicator 76 is provided which can be used either together with or as a replacement for the pendulum 64 as a means for indicating the angle of the rays emitting from the head lamps. As will be seen clearly in the drawings, the top of the housing 18 is further provided with a longitudinally extending window 78 for viewing the interior of the housing 18.

In practical operation, the car is placed on a level floor and the headlight doors are removed. The clamps 32 are placed over the seal beam retainer rims 16 and secured thereon by means of the split clamp screws 36. Before the screw 36 is tightened, the housing is turned until the pendulum 64 hangs perpendicular with the grid plate 46. If the angle of the rays emitting from the head lamp are not parallel with the longitudinally extending lines 48 on the grid, the adjusting screw 42 is loosened or tightened so that the entire housing 18 is pivoted to the position where the lines 48 become parallel to the emitting rays. In this position, the pointer of the pendulum 64 will, of course, be off center. Thereafter, the conventional adjusting screws on the head lamps (not shown) can be tightened or loosened so that the point of the pendulum is again in alinement with the center of the scale 72. If it is desired, the spirit level 76 can be used to functionally replace the pendulum 64 and pointer 66. To adjust the seal beam headlights straight ahead or with relationship to each other, the adjusting screws on the head lamps can be loosened or tightened to rotate the individual head lamps so that the plumb line 24 lies perfectly flat on both of the squaring plates 20 secured to the forward ends of each of the housings 18. The grid plate 46 may be angularly pivoted with adjusting screw 54 to bring out the most satisfactory visual condition within the housing 18.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. An apparatus for checking the alignment of a pair of seal beam headlights comprising a pair of substantially cylindrical housings, means for clamping said housings to the rims of the seal beam headlights, each of said housings including a generally vertically disposed grid having transversely spaced longitudinally extending parallel lines, means pivotally securing for movement in a horizontal direction each of said grids at one end thereof in its respective housing, means for vertically adjusting each of said housings relative to a corresponding headlight, means for moving each of said grids from its initial position to one wherein the lines thereon extend parallel with the rays emitting from a corresponding headlight, means indicating the displacement of each of said grids from its initial position, and means carried by both of said housings for indicating the relative angular positions of the headlights.

2. The combination of claim 1, wherein said grid moving means includes an internally threaded aperture in each of said grids adjacent the free end portion and a rod extending through each of said housings and including a central externally threaded portion received in said threaded aperture.

3. The combination of claim 1, wherein said grid displacement indicating means includes a pendulum suspended on each of said grids, an index on said pendulum and a scale on said grid cooperating with said index.

4. The combination of claim 1, wherein said last-named means includes horizontal plates secured to said housings, a plumb line entrained over said plates, said line including bobs at its free ends, and means for guidingly retaining said plumb line on said plates.

GEORGE H. RUSSELL.
FOUNT L. RICE.

REFERENCES CITED

The following references are of record in the file of this patent:

UNITED STATES PATENTS

| Number | Name | Date |
|---|---|---|
| 1,707,593 | Arbuckle | Apr. 2, 1929 |
| 1,847,652 | Jenkins | Mar. 1, 1932 |
| 1,987,692 | Linendoll et al. | Jan. 15, 1935 |
| 2,003,797 | Arbuckle | June 4, 1935 |
| 2,144,838 | Falge | Jan. 23, 1939 |